(12) United States Patent
Nissan-Cohen et al.

(10) Patent No.: US 8,599,311 B2
(45) Date of Patent: Dec. 3, 2013

(54) METHODS CIRCUITS DEVICES AND SYSTEMS FOR TRANSMISSION AND DISPLAY OF VIDEO

(75) Inventors: Yoav Nissan-Cohen, Tel Aviv (IL); Shay Freudlich, Sunnyvale, CA (US); Uri Kanonich, Herzlia (IL); Zvi Reznic, Tel Aviv (IL)

(73) Assignee: Amimon Ltd., Herzlia (IL)

( * ) Notice: Subject to any disclaimer, the term of this patent is extended or adjusted under 35 U.S.C. 154(b) by 0 days.

(21) Appl. No.: 13/067,993

(22) Filed: Jul. 14, 2011

(65) Prior Publication Data

US 2013/0016283 A1     Jan. 17, 2013

(51) Int. Cl.
*H04N 7/00* (2011.01)
(52) U.S. Cl.
USPC ............................................. 348/552
(58) Field of Classification Search
USPC ............ 348/552, 553, 725, 723, 734; 725/34, 725/80, 133, 118, 138
See application file for complete search history.

(56) References Cited

U.S. PATENT DOCUMENTS

| | | | |
|---|---|---|---|
| 6,781,635 B1 * | 8/2004 | Takeda | 348/552 |
| 7,900,236 B2 * | 3/2011 | Barsoum et al. | 725/138 |
| 7,969,508 B2 * | 6/2011 | Cho | 348/555 |
| 2002/0130973 A1 * | 9/2002 | Levandowski | 348/588 |
| 2003/0112335 A1 * | 6/2003 | Strandwitz et al. | 348/211.2 |
| 2005/0174488 A1 * | 8/2005 | Chennakeshu | 348/552 |
| 2006/0031889 A1 * | 2/2006 | Bennett et al. | 725/80 |
| 2007/0165144 A1 * | 7/2007 | Bennett et al. | 348/734 |
| 2008/0092200 A1 * | 4/2008 | Grady et al. | 725/133 |
| 2009/0249424 A1 * | 10/2009 | Gordon et al. | 725/118 |
| 2011/0063511 A1 * | 3/2011 | Karaoguz et al. | 348/564 |
| 2011/0185204 A1 * | 7/2011 | Louboutin et al. | 713/320 |
| 2012/0131610 A1 * | 5/2012 | Gutierrez et al. | 725/34 |

* cited by examiner

*Primary Examiner* — Paulos M Natnael
(74) *Attorney, Agent, or Firm* — Eitan, Mehulal & Sadot

(57) ABSTRACT

Disclosed are methods, circuits, devices and associated executable code for facilitating transmission, reception and presentation (e.g. rendering) of video information/signals on a video display unit such as a flat-screen display, a touch-screen and/or a tablet computing platform. There may be provided a video display unit adapted to receive video signals through two or more video signal paths, wherein one of the signal paths (i.e. a first signal path) may be a wired signal path. Another signal path (i.e. a second signal path) may be a wireless signal path. The display unit may be matched or paired to a matched computing platform. The paired matched computing platform may send video signals to the display unit along the wired signal path, e.g. when the display unit is docked with the matched computing platform. The paired matched computing platform may send video signals to the display unit along the wireless signal path, e.g. when the display unit is disconnected from the matched computing platform.

20 Claims, 14 Drawing Sheets

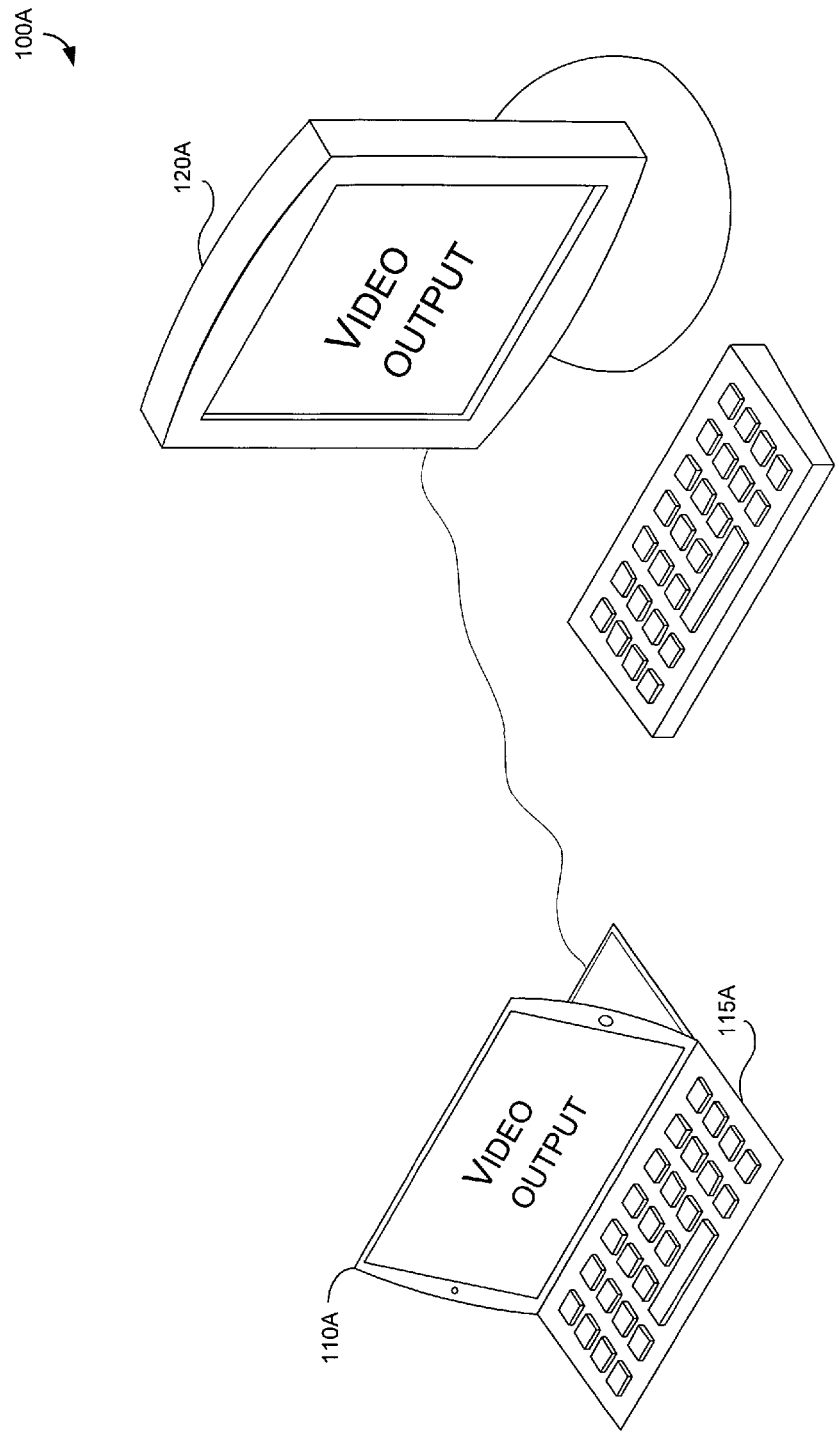

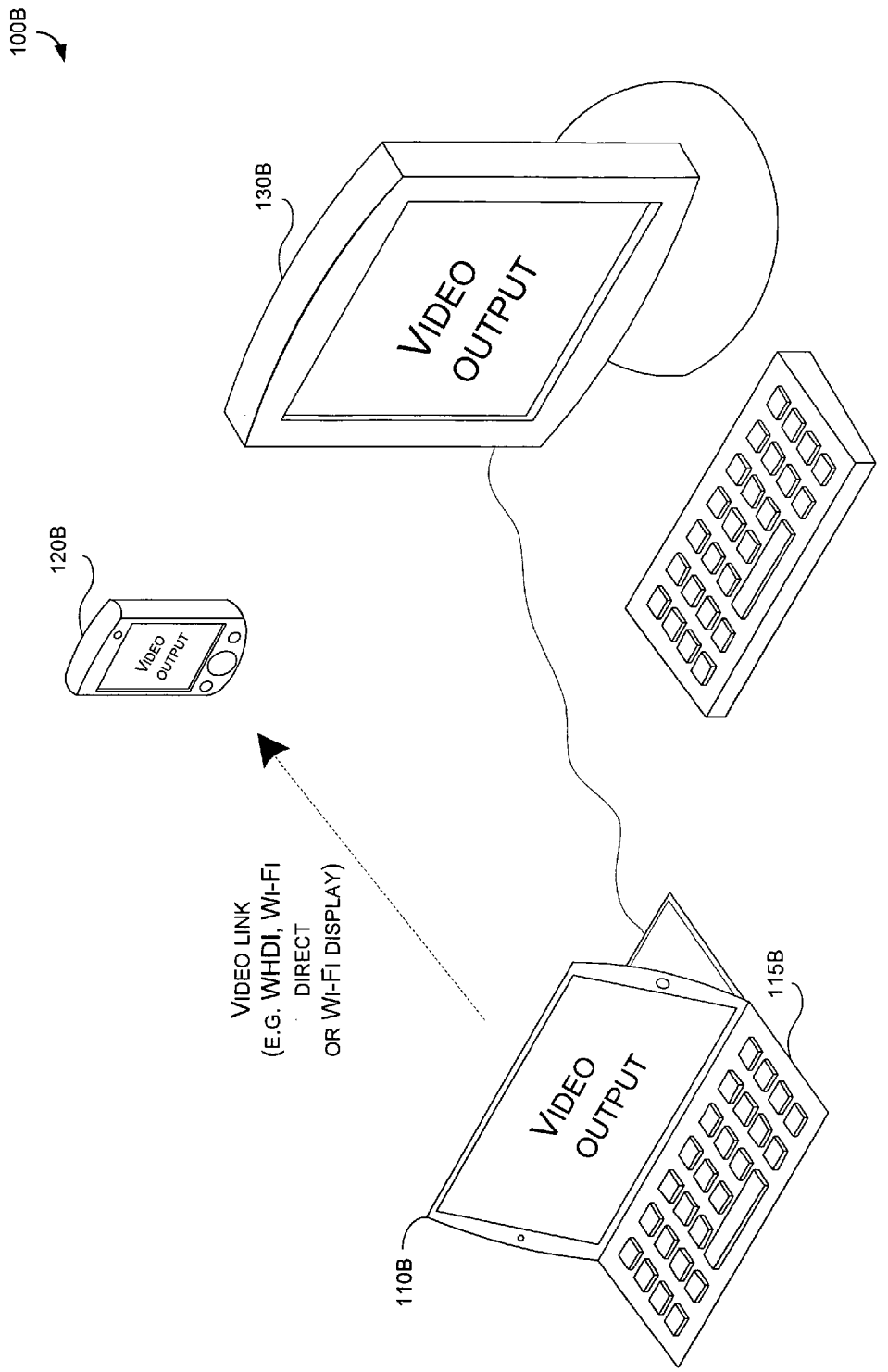

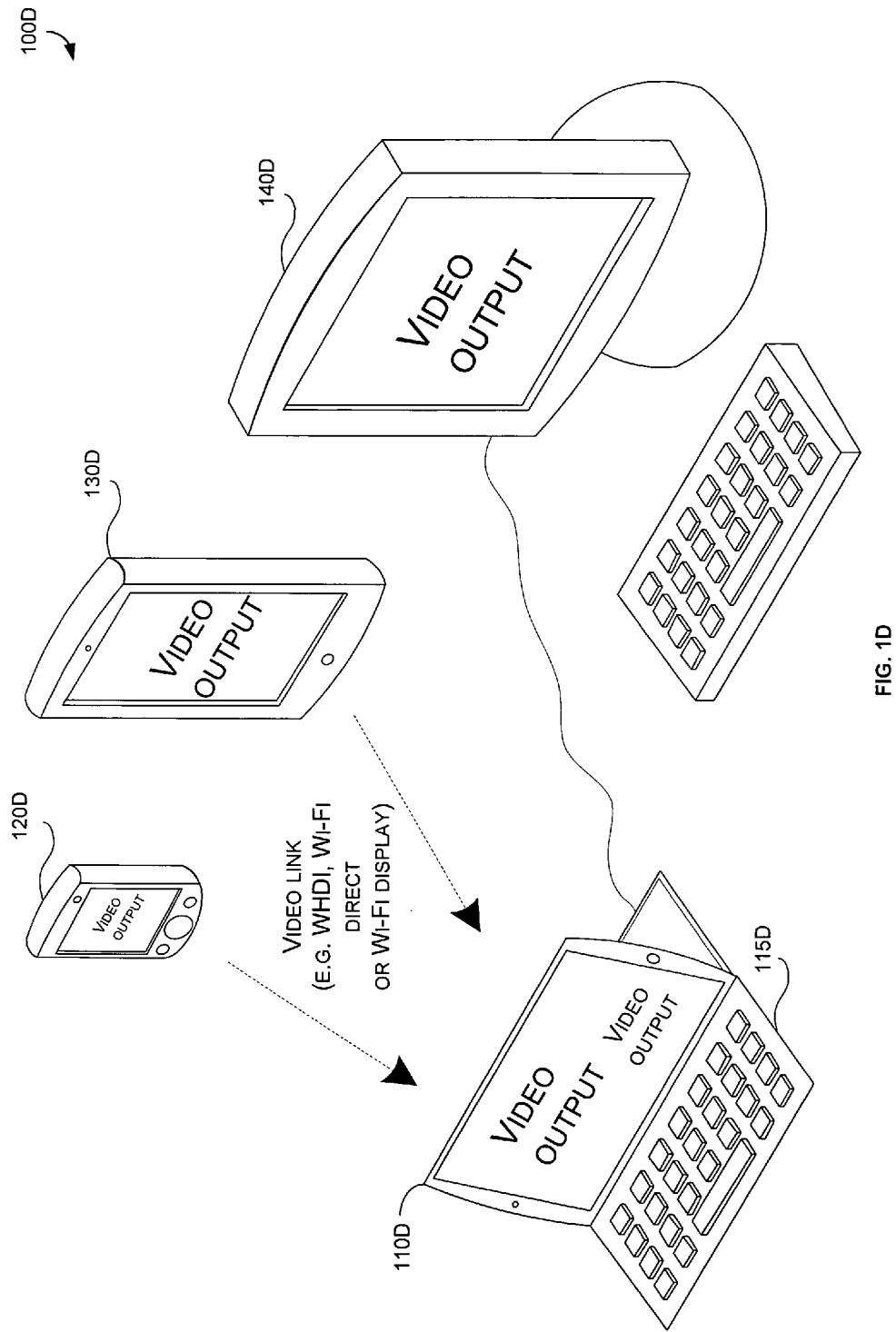

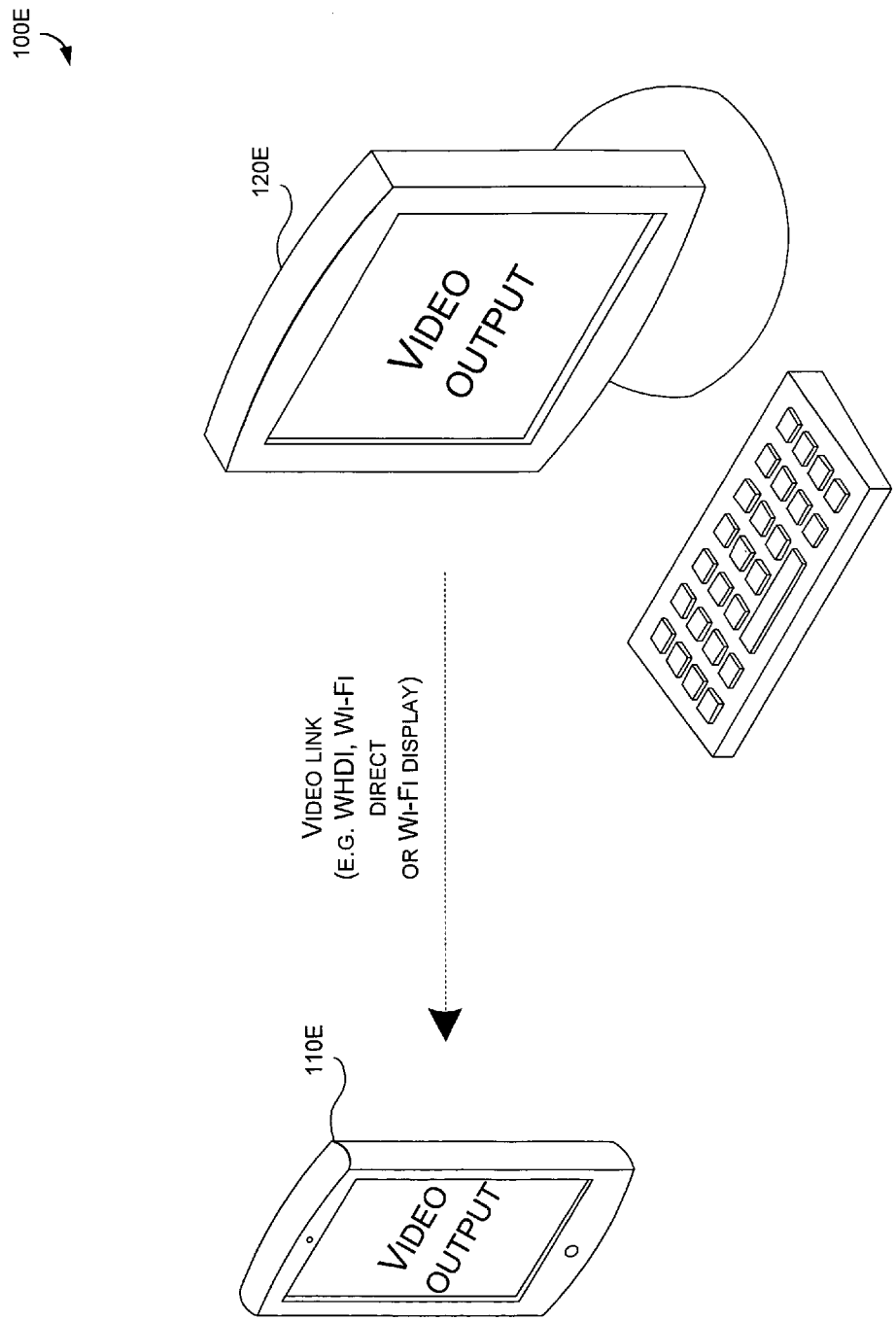

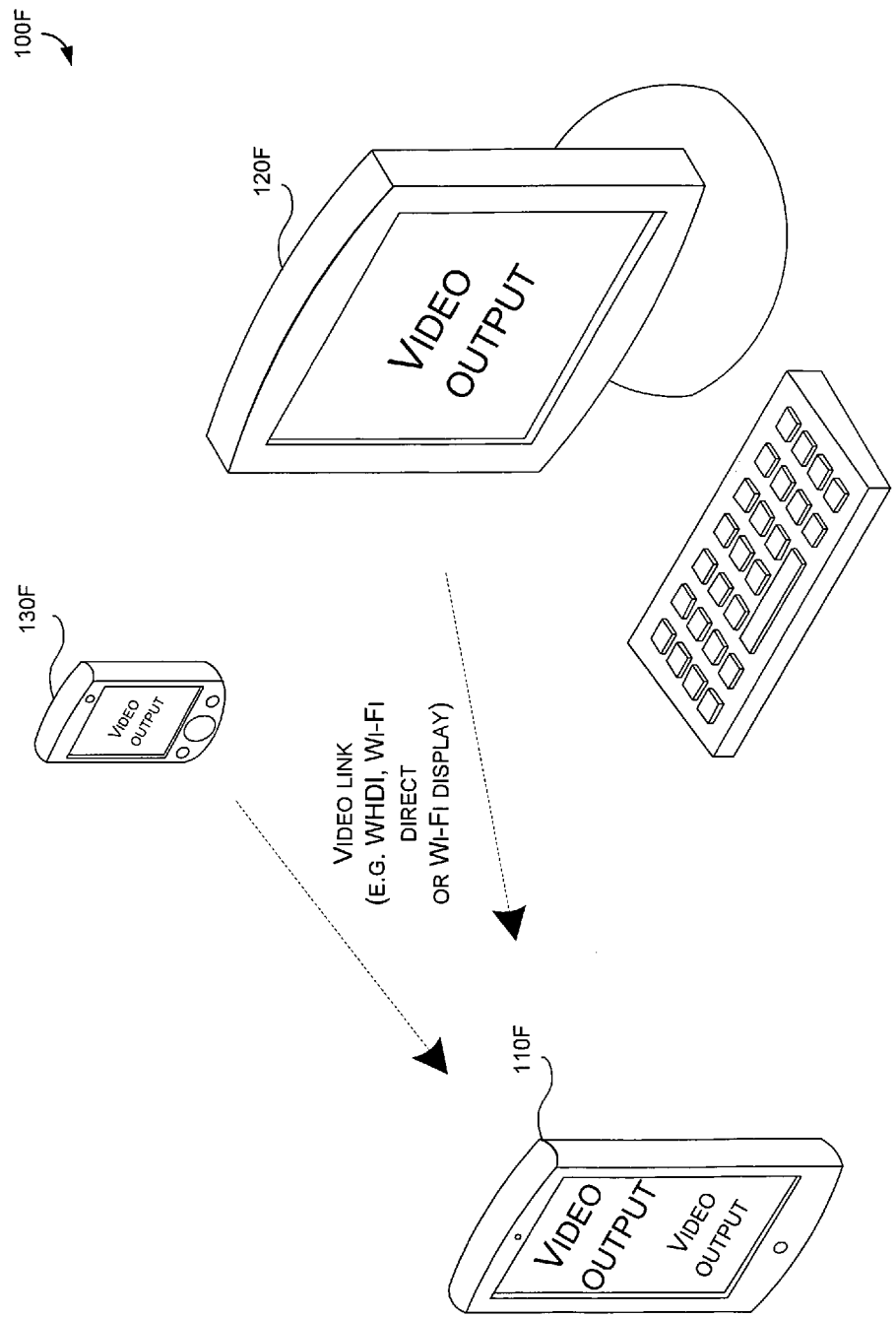

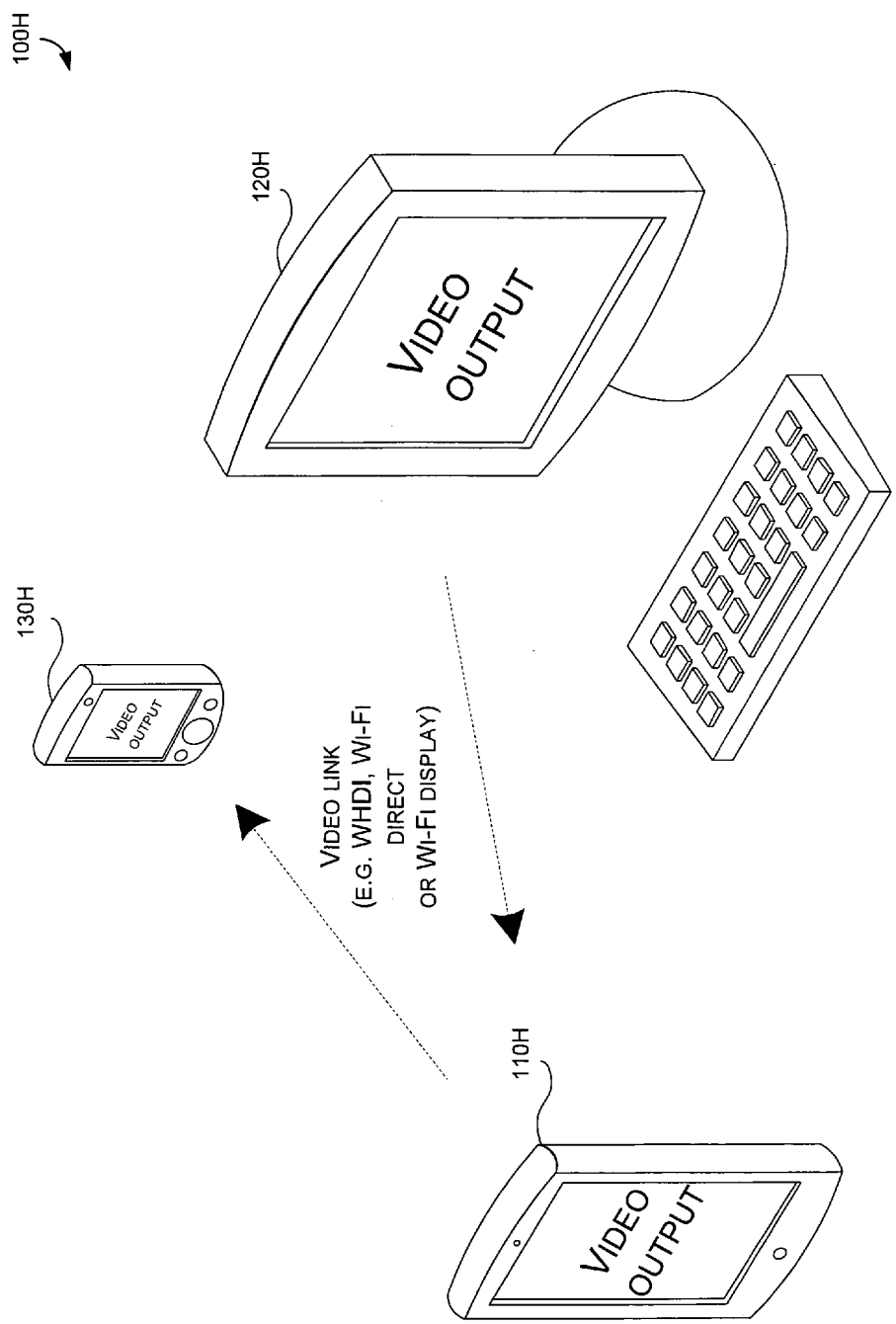

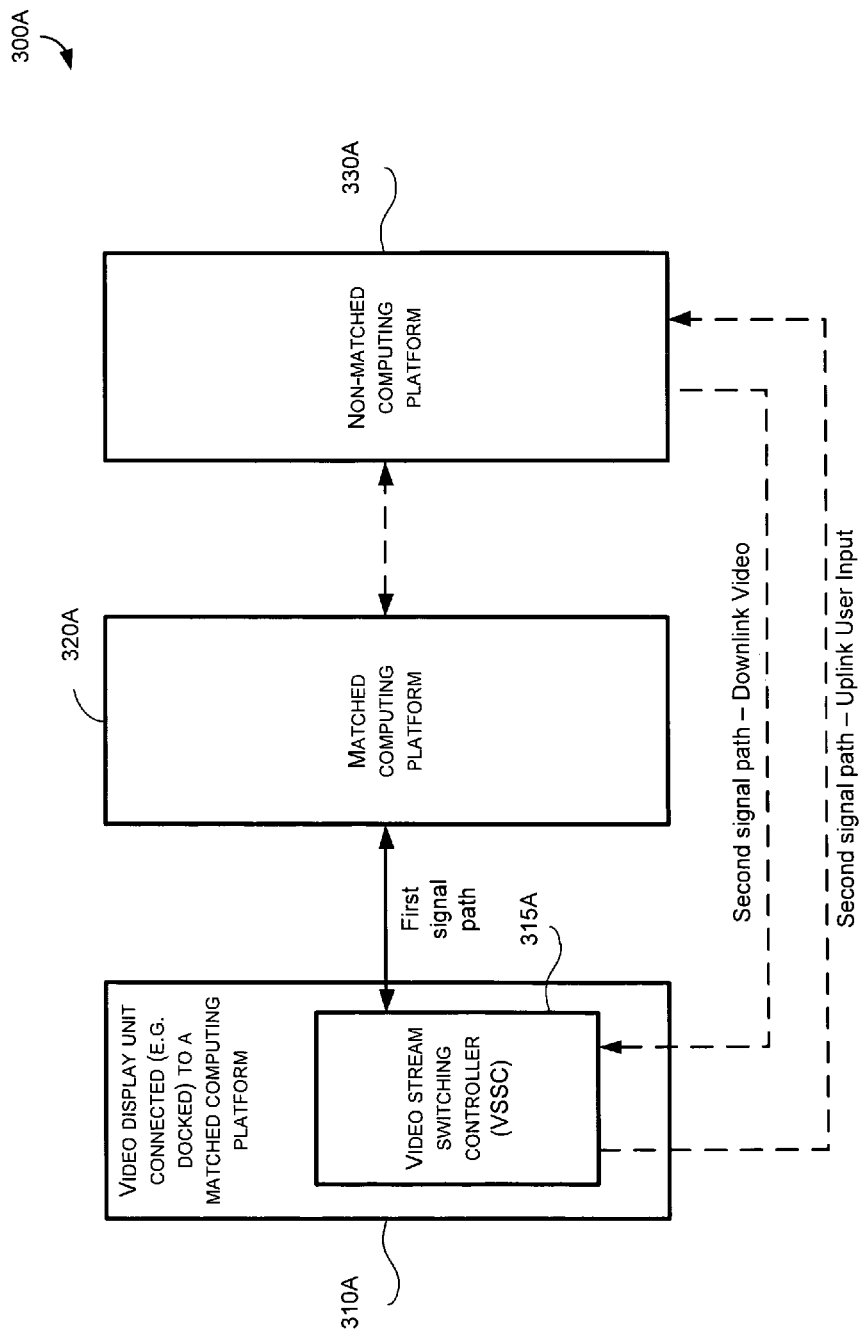

METHODS CIRCUITS DEVICES AND SYSTEMS FOR TRANSMISSION AND DISPLAY OF VIDEO

FIELD OF THE INVENTION

Some embodiments relate generally to the fields of computing and communication, more specifically to methods, circuits, devices and systems for video (e.g. video stream) transmission to one or more displays, including native displays, mobile displays, detachable displays and/or displays associated/matched/attached to a computing platform.

BACKGROUND

Wireless communication has rapidly evolved over the past decades. Even today, when high performance and high bandwidth wireless communication equipment is made available, there is demand for even higher performance at higher data rates, which may be required by more demanding applications.

Video signals may be generated or received by various mobile computing or communications devices, for example, a laptop computer, a netbook, a tablet computer, a smart phone, a game console, an e-book reader, or any other suitable mobile computing or communications device. In many devices, for example, video signals are generated by the device to view on an integral viewing screen, store or transmit to a functionally associated device. Video signals may be received from a functionally associated device, an internal or external memory, a data server, a streaming application, a removable media storage device or any other suitable media storage.

In many cases, the integral viewing screen may be too small and/or may be of poor quality for certain applications (e.g. high definition movie viewing). Thus, wireless transmission of the video signals to a larger screen is preferred.

WHDI—Wireless Home Digital Interface is a standard for wireless high-definition video connectivity between a video source and video sink (e.g. display). It provides a high-quality, uncompressed wireless link which can support delivery of equivalent video data rates of up to 3 Gbit/s (including uncompressed 1080p and stereoscopic 3-D) in a 40 MHz channel within the 5 GHz unlicensed band. Equivalent video data rates of up to 1.5 Gbit/s (including uncompressed 1080i and 720p) can be delivered on a single 20 MHz channel in the 5 GHz unlicensed band, conforming to worldwide 5 GHz spectrum regulations. Range is beyond 100 feet (30 m), through walls, and latency is less than one millisecond.

There have been considerable advancements in the field of computing which recently produced computing products such as the tablet, tablet PC and the like. A tablet PC provides for a very rich and interactive interface experience with relatively large displays and touch-screen inputs. Nevertheless, due to their relatively small size and associated cost constraints, tablet PCs are inherently limited in processing capacity and energy storage capacity.

Both desktop computers and even mobile phones have continuously growing processing power.

There have been considerable advancements in the field of wireless communication which have resulted in communication circuits suitable for transmission of high definition video with substantially no latency.

There is a need in the field of wireless communication for providing a display/interface device having usability characteristics of a tablet PC with augmented processing power, video sharing with other devices and real-time switching between video streams.

SUMMARY OF THE INVENTION

The present invention includes methods, circuits, devices and associated executable code for facilitating transmission, reception and presentation (e.g. rendering) of video information/signals on a video display unit such as a flat-screen display, a touchscreen and/or a tablet computing platform. According to some embodiments of the present invention, there may be provided a video display unit adapted to receive video signals through two or more video signal paths, wherein one of the signal paths (i.e. a first signal path) may be a wired signal path. Another signal path (i.e. a second signal path) may be a wireless signal path. According to some embodiments of the present invention, the display unit may be matched or paired to a matched computing platform. The paired matched computing platform may send video signals to the display unit along the wired signal path, e.g. when the display unit is docked with the matched computing platform. According to further embodiments of the present invention, the paired matched computing platform may send video signals to the display unit along the wireless signal path, e.g. when the display unit is disconnected from the matched computing platform.

According to some embodiments of the present invention, a video display unit may be adapted to receive, through a wired or wireless signal path, video signals from a non-matched computing platform. According to further embodiments of the present invention, the video display unit may render the video signals received from the non-matched computing platform concurrently with receiving and rendering video signals from a matched computing platform (i.e. in a picture-in-picture—PIP configuration).

According to some embodiments of the present invention, a first signal path may be a wired video bus including associated video data bus circuitry (e.g. including a display mini card—DMC). According to further embodiments of the present invention, a display unit may receive video signals originating from a matched computing platform (i.e. along the first signal path). According to further embodiments of the present invention, the display unit may receive video signals originating from a non-matched computing platform, wherein the video signals are transmitted (e.g. over WHDI, Wi-Fi direct or Wi-Fi display) to the matched platform for processing (e.g. decoding, mixing, etc.) and display (i.e. along the first signal path).

According to some embodiments of the present invention, a second signal path may be over a wireless (e.g. WHDI, Wi-Fi direct or Wi-Fi display) architecture including associated circuitry (e.g. WHDI transceiver, Wi-Fi direct transceiver or Wi-Fi display transceiver). According to further embodiments of the present invention, a display unit may receive video signals originating from a matched computing platform (i.e. along the second signal path). According to further embodiments of the present invention, the display unit may receive video signals originating from a non-matched computing platform, wherein the video signals are transmitted (e.g. over WHDI, Wi-Fi direct or Wi-Fi display) to the matched platform for processing (e.g. decoding, mixing, etc.) and display (i.e. along the second signal path). According to further embodiments of the present invention, the display unit may transmit video signals to a transceiver functionally associated with an additional display unit and/or to a transceiver functionally associated with a non-matched computing platform.

According to some embodiments of the present invention, a display unit may include an integral or otherwise functionally associated video stream switching controller (VSSC), to switch between a first signal path and a second signal path when sensing a connection and disconnection of the display unit from a matched computing platform. According to further embodiments of the present invention, the VSSC may also manage video signal source authentication, authorization, registration, decryption, mixing, etc.

According to some embodiments of the present invention, while the display unit is connected to the matched computing platform, the display unit may receive video signals from the matched computing platform over the first signal path. According to further embodiments of the present invention, the display unit may receive video signals from a non-matched computing platform over the second signal path. According to further embodiments of the present invention, the display unit may receive video signals from a non-matched computing platform that are relayed by the matched computing platform over the first signal path.

According to some embodiments of the present invention, while the display unit is disconnected from the matched computing platform, the display unit may receive video signals from the matched computing platform over the second signal path. Received video signals from the matched computing platform may originate from the matched computing platform, or may be relayed from a non-matched computing platform. According to further embodiments of the present invention, the display unit may receive video signals from a non-matched computing platform or an additional display unit over the second signal path. The non-matched computing platform signal may be received concurrently with a video signal received from the matched computing platform. Concurrently received video signals may be mixed by the display unit (e.g. PIP).

According to some embodiments of the present invention, a video stream may be composed of sequential video frames, and each video frame may be composed of one or more video blocks including one or more sets of pixels. Prior to transmission of the data associated with a video block, the video block data may be transformed into a set of transform (e.g. frequency) coefficients using a spatial to frequency transform such as a two dimensional discrete cosine transform (DCT). According to some embodiments of the present invention, only a portion or subset of the coefficients of a given video block may be transmitted. Selection of the subset of transform coefficients to be transmitted may be based on a characteristic of the video block. According to further embodiments of the present invention, only a portion or subset of coefficients chosen for transmission may be calculated and transmitted.

According to further embodiments of the present invention, a first portion or subset of the coefficients may be transmitted using a first RF data link and a second portion or subset of the coefficients may be transmitted using a second RF link. One of the RF link may be more secure and/or reliable than the other RF link (e.g. with forward error correction and/or acknowledgement receipts). One set of coefficients may include more spatial information than another set of coefficients.

According to some embodiments of the present invention, when a given video block is determined to be static, frequency coefficients not previously transmitted for a corresponding block may be transmitted. An indicator indicating that this block is static may be transmitted along with the selected coefficients. An image reconstruction module (e.g. decoder and graphics circuit) on the receiver side (e.g. video sink) may receive the indicator and in response may keep a previously generated video block image and may use the received coefficients to augment or enhance the previously generated video block image. The coefficient set selected for a video block designated as static may also include coefficients previously transmitted for a corresponding block from the previous frame. These retransmitted coefficients, which were transmitted as part of the previous frame, may be used by the reconstruction module to enhance the displayed video image by averaging corresponding coefficient values.

According to some embodiments of the present invention, there may be proportionality between the subset of coefficients selected and the security and reliability of the transmission link (e.g. optional forward error correction and/or acknowledgement receipts). According to some embodiments of the present invention, the security and reliability may be based on the strength of the transmission link and/or the type of transmitter used from a plurality of available transmitters. According to some embodiments of the present invention, an RF link with low security and reliability may transmit block transform coefficient data along unreliable bit streams which may not include data link protocols including data frames and/or flow/error control. According to further embodiments of the present invention, a secure and reliable RF link may include data link protocols including the framing of coefficient data and/or flow/error control. According to some embodiments of the present invention, acknowledgments, negative acknowledgements, error detection and/or correction, and checksums may be implemented as features of a secure and reliable RF link.

According to further embodiments of the present invention, video signals may be transmitted using transmission symbols comprised of video data frame coefficients. According to further embodiments of the present invention, low spatial frequency coefficients (i.e. DC coefficients, and/or near DC coefficients) may be represented in a coarse, (i.e. digital) manner. According to further embodiments of the present invention, the low spatial frequency coefficients may be represented as one or more of a plurality of constellation points of a symbol by performing a quantization on their values and mapping them. Coarse data transmission may include additional data values and/or vectors relating to a subset of associated relatively higher frequency coefficients to be transmitted within a separate transmission frame.

According to some embodiments of the present invention, relatively higher frequency coefficients and the quantization errors of the DC and the near DC components may be mapped as fine-constellation points thus providing the fine granularity (i.e. analog-like) values that at an extreme fineness provides for a continuous representation of these values. Further details with regard to methods and systems of uncompressed, wireless transmission of video are described in U.S. patent application Ser. No. 11/551,641 which application is hereby incorporated by reference in its entirety.

According to some embodiments of the present invention, frequency coefficient based transmission symbols may be transmitted using a quadrature amplitude modulation (QAM) based transmitter, an orthogonal frequency-division multiplexing (OFDM) based transmitter, or any other transmitter adapted to transmit data using transmission symbols. According to further embodiments of the present invention, transmission symbol processing may be performed by an integral DSP or by a fast Fourier transformer (FFT) co-processor.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1A is a diagram illustrating an exemplary arrangement of a matched computing platform and display in a first mode of operation where the platform and display are physically connected and the display is receiving a video signal from the computing platform over a wired video bus;

FIG. 1B is a diagram illustrating an exemplary arrangement of a matched computing platform and display in a first mode of operation where the platform and display are physically connected, the display is receiving a video signal from the computing platform over a wired video bus and transmitting the video signal to a non-matched device over a video link (e.g. WHDI, Wi-Fi direct or Wi-Fi display);

FIG. 1D is a diagram illustrating an exemplary arrangement of a matched computing platform and display wherein the platform and display are physically connected, the display is receiving a video signal from the computing platform over a wired video bus, and is receiving a wireless video signal from a non-matched device such as another computing platform or another display;

FIG. 1E is a diagram illustrating an exemplary arrangement of a matched computing platform and display in a second mode of operation where the platform and display are physically disconnected and the video display is receiving a video signal from the computing platform over a video link (e.g. WHDI, Wi-Fi direct or Wi-Fi display);

FIG. 1F is a diagram illustrating an exemplary arrangement of a matched computing platform and display in a second mode of operation where the platform and display are physically disconnected and the video display is receiving a video signal from both the matched computing platform and a non-matched device over one or more video links (e.g. WHDI, Wi-Fi direct or Wi-Fi display);

FIG. 1H is a diagram illustrating an exemplary arrangement of a matched computing platform and display in a second mode of operation where the platform and display are physically disconnected and the video display is receiving a video signal from the matched computing platform over one or more video links (e.g. WHDI, Wi-Fi direct or Wi-Fi display), and a non-matched device is receiving a video signal from the display over a video link (e.g. WHDI, Wi-Fi direct or Wi-Fi display);

FIG. 3A is a block diagram of a matched computing platform and display in a first mode of operation where the platform and display are physically connected, according to some embodiments of the present invention;

Figure 1C:
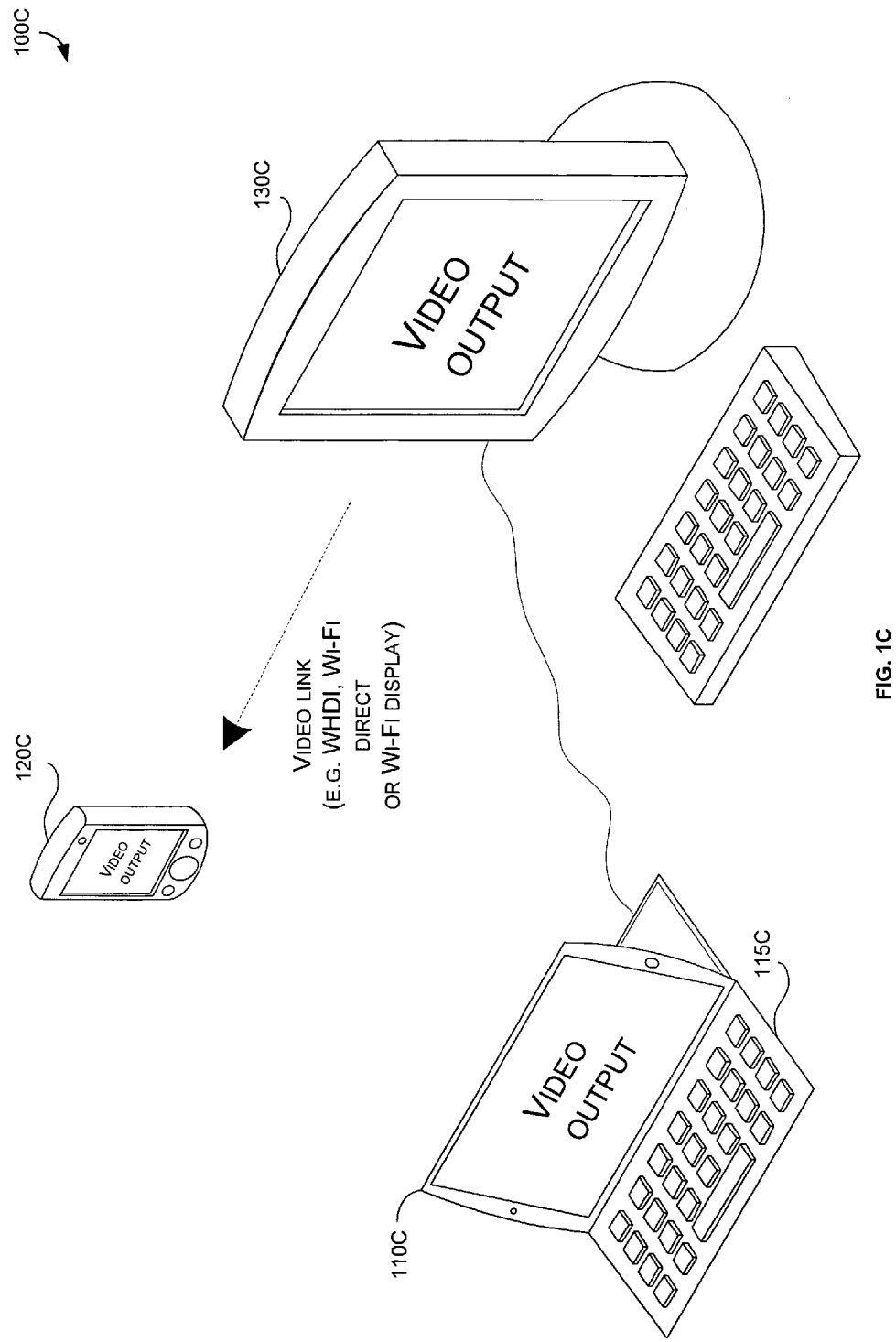
FIG. 1C is a diagram illustrating an exemplary arrangement of a matched computing platform and display in a first mode of operation where the platform and display are physically connected, the display is receiving a video signal from the computing platform over a wired video bus, and a non-matched device is receiving the video signal from the computing platform over a video link (e.g. WHDI, Wi-Fi direct or Wi-Fi display)

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that some embodiments may be used in a variety of applications. Although embodiments of the invention are not limited in this respect, one or more of the methods, devices and/or systems disclosed herein may be used in many applications, e.g., civil applications, military applications, medical applications, commercial applications, or any other suitable application. In some demonstrative embodiments the methods, devices and/or systems disclosed herein may be used in the field of consumer electronics, for example, as part of any suitable television, video Accessories, Digital-Versatile-Disc (DVD), multimedia projectors, Audio and/or Video (A/V) receivers/transmitters, gaming consoles, video cameras, video recorders, portable media players, cell phones, mobile devices, and/or automobile A/V accessories. In some demonstrative embodiments the methods, devices and/or systems disclosed herein may be used in the field of Personal Computers (PC), for example, as part of any suitable desktop PC, notebook PC, monitor, and/or PC accessories. In some demonstrative embodiments the methods, devices and/or systems disclosed herein may be used in the field of professional A/V, for example, as part of any suitable camera, video camera, and/or A/V accessories. In some demonstrative embodiments the methods, devices and/or systems disclosed herein may be used in the medical field, for example, as part of any suitable endoscopy device and/or system, medical video monitor, and/or medical accessories. In some demonstrative embodiments the methods, devices and/or systems disclosed herein may be used in the field of security and/or surveillance, for example, as part of any suitable security camera, and/or surveillance equipment. In some demonstrative embodiments the methods, devices and/or systems disclosed herein may be used in the fields of military, defense, digital signage, commercial displays, retail accessories, and/or any other suitable field or application.

Although embodiments of the invention are not limited in this respect, one or more of the methods, devices and/or systems disclosed herein may be used to wirelessly transmit video signals, for example, High-Definition-Television (HDTV) signals, between at least one video source and at least one video destination. In other embodiments, the methods, devices and/or systems disclosed herein may be used to transmit, in addition to or instead of the video signals, any other suitable signals, for example, any suitable multimedia signals, e.g., audio signals, between any suitable multimedia source and/or destination.

Although some demonstrative embodiments are described herein with relation to wireless communication including video information, some embodiments may be implemented to perform wireless communication of any other suitable information, for example, multimedia information, e.g., audio information, in addition to or instead of the video information. Some embodiments may include, for example, a method, device and/or system of performing wireless communication of A/V information, e.g., including audio and/or video information. Accordingly, one or more of the devices, systems and/or methods described herein with relation to video information may be adapted to perform wireless communication of A/V information.

Some demonstrative embodiments may be implemented to communicate wireless-video signals over a wireless-video communication link, as well as Wireless-Local-Area-Network (WLAN) signals over a WLAN link. Such implementation may allow a user, for example, to play a movie, e.g., on a laptop computer, and to wirelessly transmit video signals corresponding to the movie to a video destination, e.g., a screen, while maintaining a WLAN connection, e.g., with the Internet and/or one or more other devices connected to a WLAN network. In one example, video information corresponding to the movie may be received over the WLAN network, e.g., from the Internet.

According to some embodiments of the present invention, there may include a video display unit for reception and presentation of video signals. The video display unit may comprise: a display adapted to display one or more received video signals; a first video signal reception path adapted to receive video signals from a matched computing platform; a second video signal reception path adapted to receive wireless video signals from the matched computing platform; and control logic adapted to: (1) regulate operation of one or more circuits of the display unit, and (2) to regulate routing of video signals received over the first and second video signal reception paths to the display.

According to some embodiments of the present invention, the first video signal reception path may be a wired video signal reception path. According to some embodiments of the present invention, one or more video signals received from a matched computing platform may originate from the matched computing platform. According to some embodiments of the present invention, one or more video signals received from a matched computing platform may originate from a non-matched computing platform. According to some embodiments of the present invention, one or more video signals received from a matched computing platform may originate from another video display unit.

According to some embodiments of the present invention, the second video signal reception path may be further adapted to receive wireless video signals from a non-matched computing platform. According to some embodiments of the present invention, the second video signal reception path may be further adapted to receive wireless video signals from another video display unit.

According to some embodiments of the present invention, the video display unit may further comprise a first video signal transmission path adapted to transmit video signals to the matched computing platform. According to further embodiments of the present invention, the first video signal transmission path may be a wired video signal transmission path.

According to some embodiments of the present invention, the video display unit may further comprise a second video signal transmission path adapted to transmit wireless video signals to the matched computing platform. According to further embodiments of the present invention, the second video signal transmission path may be further adapted to transmit wireless video signals to a non-matched computing platform. According to further embodiments of the present invention, the second video signal transmission path may be further adapted to transmit wireless video signals to another video display unit.

According to some embodiments of the present invention, there may include a computing platform for reception and transmission of video signals. The computing platform may comprise: a first video signal transmission path adapted to transmit video signals to a matched video display unit; a second video signal transmission path adapted to transmit wireless video signals to the matched video display unit; and control logic adapted to: (1) regulate operation of one or more circuits of the computing platform, and (2) to regulate routing of video signals transmitted over the first and second video signal transmission paths from the computing platform.

According to some embodiments of the present invention, the first video signal transmission path may be a wired video signal reception path. According to some embodiments of the present invention, one or more video signals transmitted to the matched video display unit may originate from the computing platform. According to some embodiments of the present invention, one or more video signals transmitted to the matched video display unit may originate from a non-matched computing platform. According to some embodiments of the present invention, one or more video signals transmitted to the matched video display unit may originate from another video display unit.

According to some embodiments of the present invention, the second video signal transmission path may be further adapted to transmit wireless video signals to a non-matched computing platform. According to some embodiments of the present invention, the second video signal transmission path may be further adapted to transmit wireless video signals to another video display unit.

According to some embodiments of the present invention, the computing platform may further comprise a first video signal reception path adapted to receive video signals from the matched video display unit. According to further embodiments of the present invention, the first video signal reception path may be a wired video signal reception path. According to further embodiments of the present invention, the computing platform may further comprise a second video signal reception path adapted to receive wireless video signals from said matched video display unit. According to further embodiments of the present invention, the second video signal reception path may be further adapted to receive wireless video signals from a non-matched computing platform. According to further embodiments of the present invention, the second video signal reception path may be further adapted to receive wireless video signals from another video display unit.

Now turning to FIG. 1A, there is shown a diagram illustrating an exemplary arrangement of a matched computing platform and display in a first mode of operation where the platform and display are physically connected and the display is receiving a video signal from the computing platform over a wired video bus.

Now turning to FIG. 1B, there is shown a diagram illustrating an exemplary arrangement of a matched computing platform and display in a first mode of operation where the platform and display are physically connected, the display is receiving a video signal from the computing platform over a wired video bus and transmitting the video signal to a non-matched device over a video link (e.g. WHDI, Wi-Fi direct or Wi-Fi display).

Now turning to FIG. 1C, there is shown a diagram illustrating an exemplary arrangement of a matched computing platform and display in a first mode of operation where the platform and display are physically connected, the display is receiving a video signal from the computing platform over a wired video bus, and a non-matched device is receiving the video signal from the computing platform over a video link (e.g. WHDI, Wi-Fi direct or Wi-Fi display).

Now turning to FIG. 1D, there is shown a diagram illustrating an exemplary arrangement of a matched computing platform and display wherein the platform and display are physically connected, the display is receiving a video signal from the computing platform over a wired video bus, and is receiving a wireless video signal from a non-matched device such as another computing platform or another display.

Now turning to FIG. 1E, there is shown a diagram illustrating an exemplary arrangement of a matched computing platform and display in a second mode of operation where the platform and display are physically disconnected and the video display is receiving a video signal from the computing platform over a video link (e.g. WHDI, Wi-Fi direct or Wi-Fi display).

Now turning to FIG. 1F, there is shown a diagram illustrating an exemplary arrangement of a matched computing platform and display in a second mode of operation where the platform and display are physically disconnected and the video display is receiving a video signal from both the matched computing platform and a non-matched device over one or more video links (e.g. WHDI, Wi-Fi direct or Wi-Fi display).

Figure 1G:
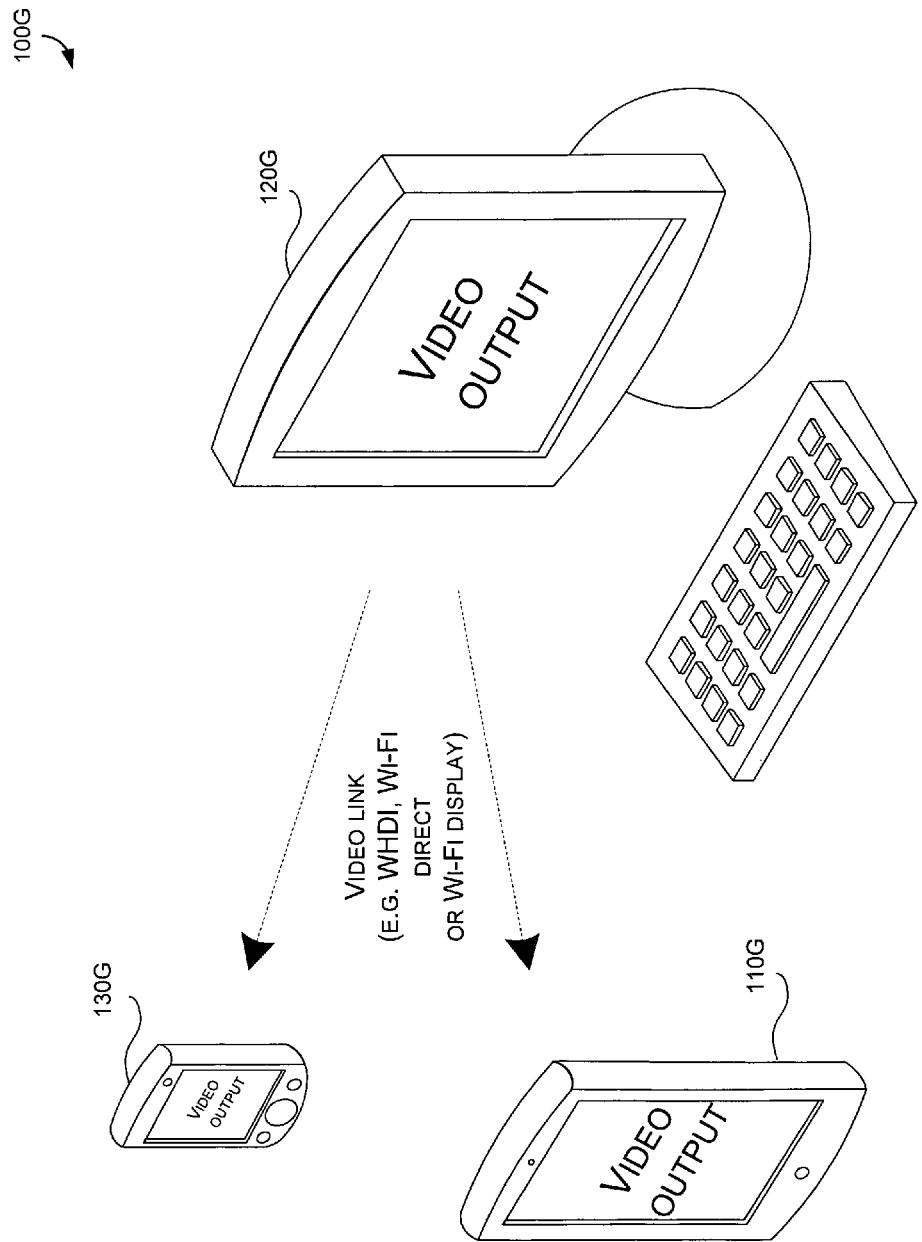
FIG. 1G is a diagram illustrating an exemplary arrangement of a matched computing platform and display in a second mode of operation where the platform and display are physically disconnected and the video display is receiving a video signal from the matched computing platform over one or more video links (e.g. WHDI, Wi-Fi direct or Wi-Fi display), and a non-matched device is receiving a video signal from the computing platform over a video link (e.g. WHDI, Wi-Fi direct or Wi-Fi display)

Now turning to FIG. 1G, there is shown a diagram illustrating an exemplary arrangement of, a matched computing platform and display in a second mode of operation where the platform and display are physically disconnected and the video display is receiving a video signal from the matched computing platform over one or more video links (e.g. WHDI, Wi-Fi direct or Wi-Fi display), and a non-matched device is receiving a video signal from the computing platform over a video link (e.g. WHDI, Wi-Fi direct or Wi-Fi display).

Now turning to FIG. 1H, there is shown a diagram illustrating an exemplary arrangement of a matched computing platform and display in a second mode of operation where the platform and display are physically disconnected and the video display is receiving a video signal from the matched computing platform over one or more video links (e.g. WHDI, Wi-Fi direct or Wi-Fi display), and a non-matched device is receiving a video signal from the display over a video link (e.g. WHDI, Wi-Fi direct or Wi-Fi display).

Figure 2A:
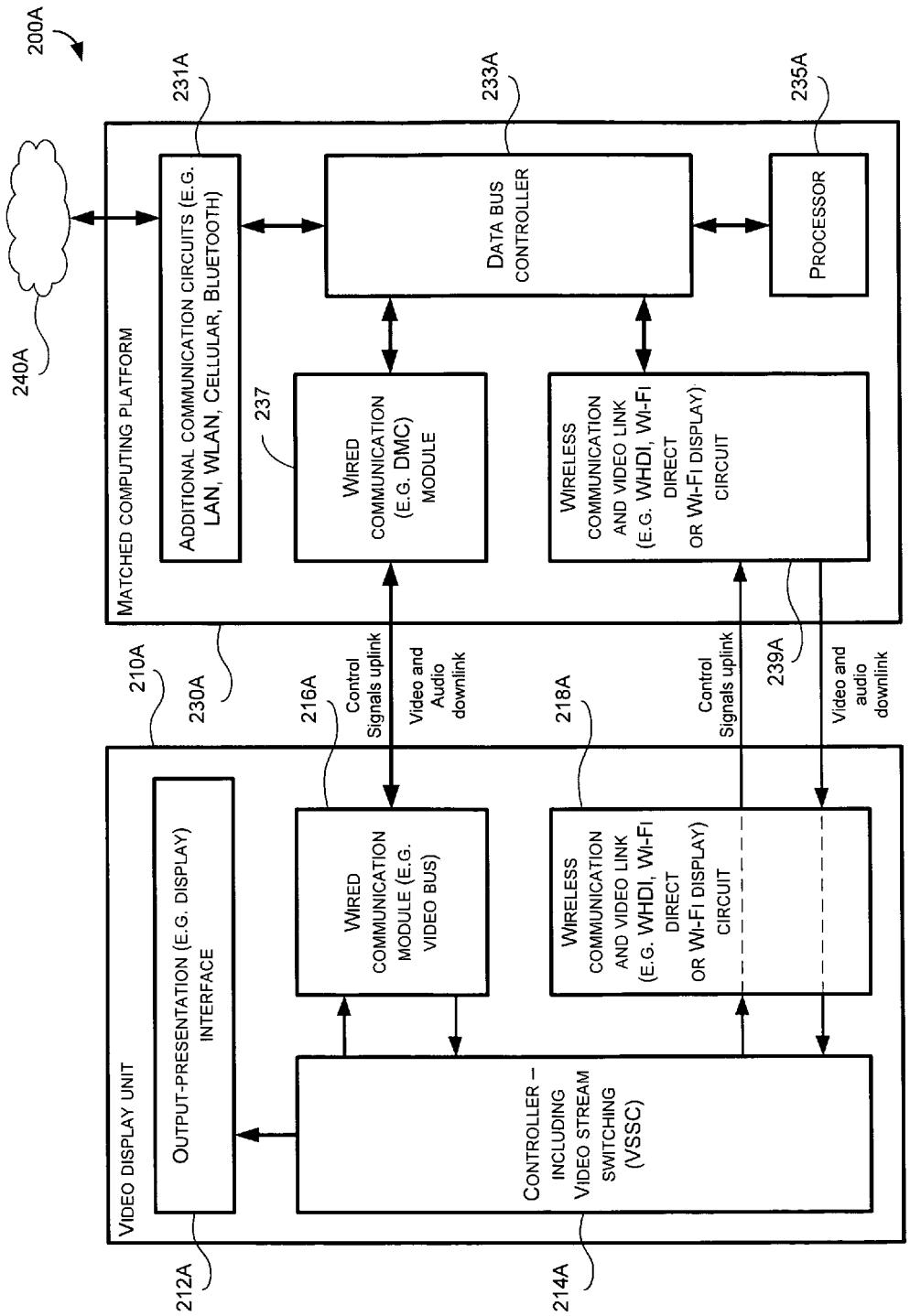
FIG. 2A is a functional block diagram of a matched computing platform and display according to embodiments of the present invention.
Figure 2B:
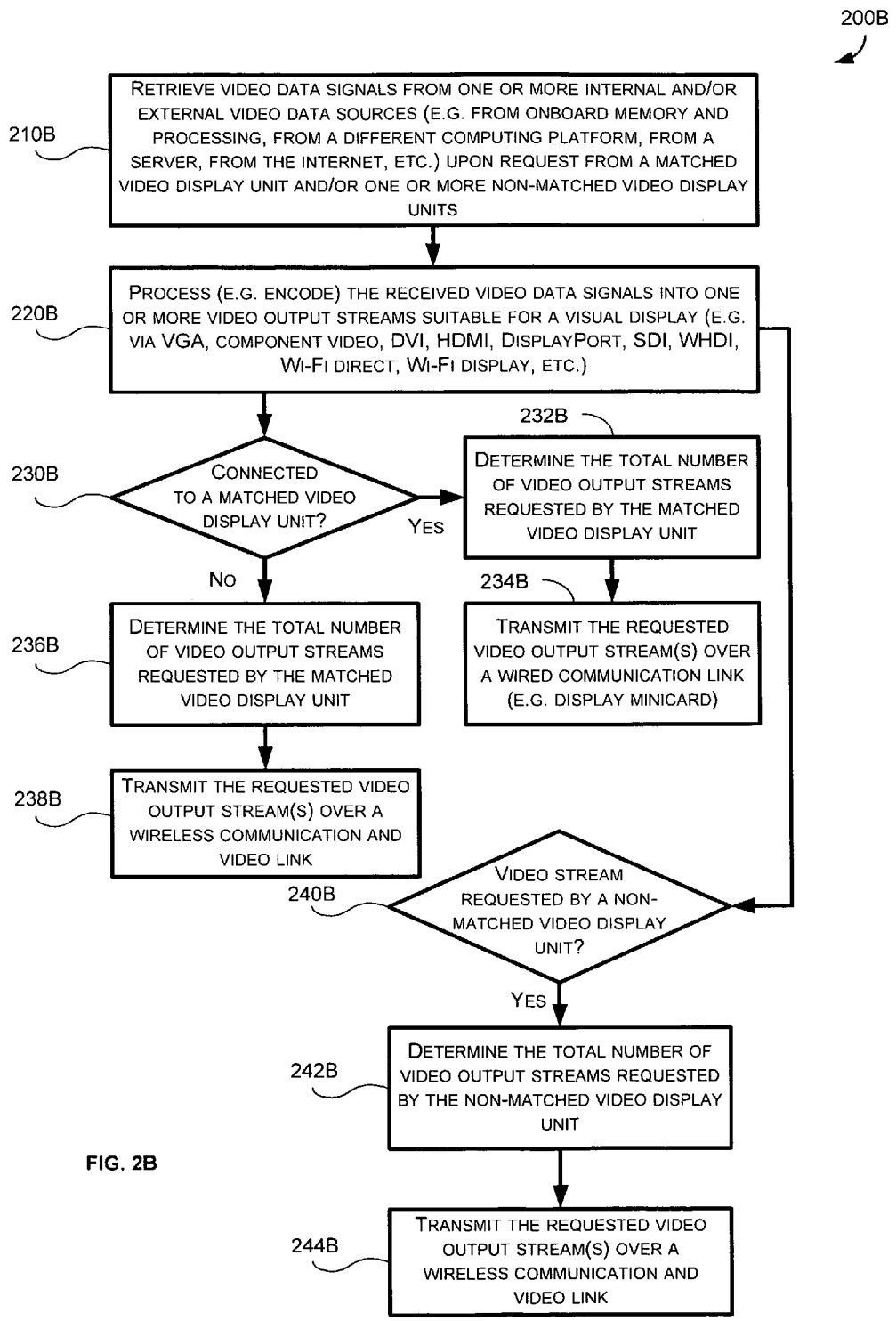
FIG. 2B is a flowchart including the steps of an exemplary method by which the computing platform of FIG. 2A may operate, in accordance with some embodiments of the present invention.
Figure 2C:
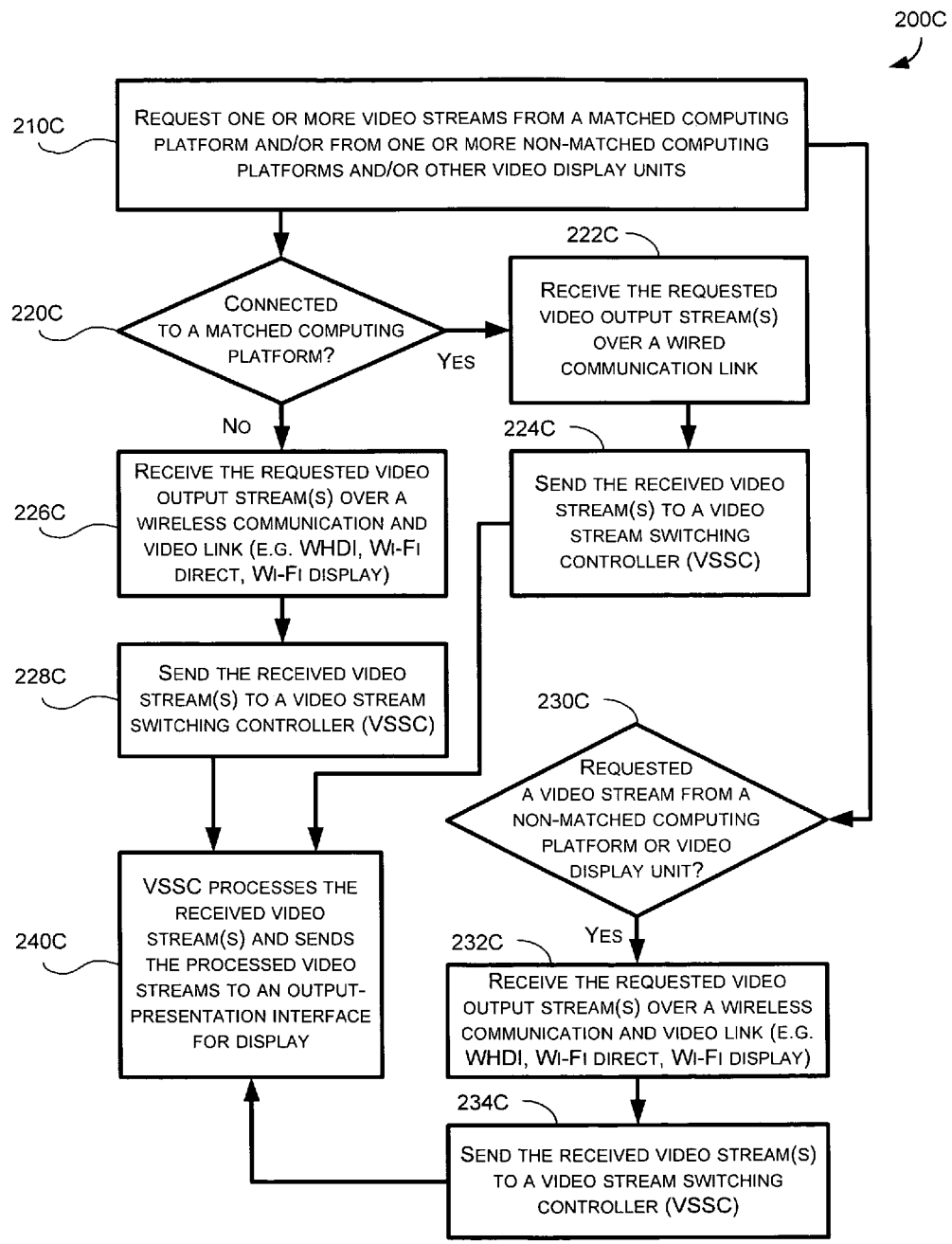
FIG. 2C is a flowchart including the steps of an exemplary method by which the display unit of FIG. 2A may operate, in accordance with some embodiments of the present invention.

Now turning to FIG. 2A, there is shown a functional block diagram of a matched computing platform and display according to embodiments of the present invention. The operation of the computing platform and display may be described in view of FIGS. 2B & 2C, showing: FIG. 2B—a flowchart including the steps of an exemplary method by which the computing platform of FIG. 2A may operate, in accordance with some embodiments of the present invention; and FIG. 2C—a flowchart including the steps of an exemplary method by which the display unit of FIG. 2A may operate, in accordance with some embodiments of the present invention.

According to some embodiments of the present invention, a matched computing platform (230A) may retrieve (210B) video data signals from one or more internal and/or external video data sources (e.g. from onboard memory and processing (235A), from a different computing platform, from a server, from the interne (240A), etc.) upon request from a matched video display unit (210A) and/or one or more non-matched video display units. According to further embodiments of the present invention (220B), the matched computing platform (230A) may process (e.g. encode) the received video data signals into one or more video output streams suitable for a visual display (e.g. via VGA, component video, DVI, HDMI, DisplayPort, SDI, WHDI, Wi-Fi direct, Wi-Fi display, etc.).

According to some embodiments of the present invention, the matched computing platform (230A) may check (230B) a connection status to a matched video display unit (210A). According to further embodiments of the present invention when the matched video display unit (210A) is disconnected from the matched computing platform (230A), the matched computing platform (230A) may determine (236B) a total number of video output streams requested by the matched video display unit (210A). The matched computing platform (230A) may transmit (238B) the requested video output stream(s) to the matched video display unit (210A) over a wireless communication link (239A). According to further embodiments of the present invention when the matched video display unit (210A) is connected to the matched computing platform (230A), the matched computing platform (230A) may determine (232B) a total number of video output streams requested by the matched video display unit (210A). The matched computing platform (230A) may transmit (234B) the requested video output stream(s) to the matched video display unit (210A) over a wired communication link (237A—e.g. display minicard).

According to some embodiments of the present invention, the matched computing platform (230A) may determine (242B) a total number of video output streams requested (240B) by a non-matched video display unit. The matched computing platform (230A) may transmit (244B) the requested video output stream(s) to the non-matched video display unit over a wireless communication link (239A).

According to some embodiments of the present invention, a video display unit (210A) may request (210C) one or more video streams from a matched computing platform (230A) and/or from one or more non-matched computing platforms and/or other video display units. According to further embodiments of the present invention, the video display unit (210A) may check (220C) a connection status to the matched computing platform (230A). According to further embodiments of the present invention when the matched video display unit (210A) is disconnected from the matched computing platform (230A), the matched video display unit (210A) may receive (226C) the requested video output stream(s) over a wireless communication and video link (218A—e.g. WHDI, Wi-Fi direct or Wi-Fi display). The matched video display unit (210A) may send (228C) the received video stream(s) to a video stream switching controller (VSSC 214A). According to further embodiments of the present invention when the matched video display unit (210A) is connected to the matched computing platform (230A), the matched video display unit (210A) may receive (222C) the requested video output stream(s) over a wired communication link (216A—e.g. video bus). The matched video display unit (210A) may send (224C) the received video stream(s) to a video stream switching controller (VSSC 214A).

According to some embodiments of the present invention, the video display unit (210A) may request (230C) a video stream from a non-matched computing platform or video display unit. According to further embodiments of the present invention, the matched video display unit (210A) may receive (232C) the requested video output stream(s) over a wireless communication and video link (218A—e.g. WHDI, Wi-Fi direct or Wi-Fi display). The matched video display unit (210A) may send (234C) the received video stream(s) to a video stream switching controller (VSSC 214A).

According to some embodiments of the present invention, a video stream switching controller (VSSC 214A) may processes (240C) received video stream(s) and send the processed video streams to an output-presentation interface for display. According to further embodiments of the present invention, the VSSC (214A) may combine received video streams for picture-in-picture viewing. The video display unit may include an output-presentation (e.g. display) interface (212A) for sending all processed video stream(s) to an integral or otherwise functionally associated display.

Now turning to FIG. 3A, there is shown a block diagram of a matched computing platform and display in a first mode of operation where the platform and display are physically connected (300A), according to some embodiments of the present invention.

According to some embodiments of the present invention, a video display unit (310A) connected (e.g. docked) to a matched computing platform (320A) may communicate with the computing platform (320A) via a first (i.e. wired) signal path. The matched computing platform may transmit one or more video streams directly to a video stream switching controller (VSSC 315A) integral to the video display unit (310A).

According to some embodiments of the present invention, a non-matched computing platform (330A) may communicate with the video display unit (310A) via a second (i.e. wireless) path. The non-matched computing platform (330A) may transmit one or more video streams directly to a video stream switching controller (VSSC 315A) integral to the video display unit (310A). According to further embodiments of the present invention, the video stream may comprise both a video stream downlink and a user input uplink. According to further embodiments of the present invention, the non-matched computing platform (330A) may transmit one or more video streams to the matched computing platform (320A) for transmission of the video streams to the video display unit (310) over the first signal path.

Figure 3B:
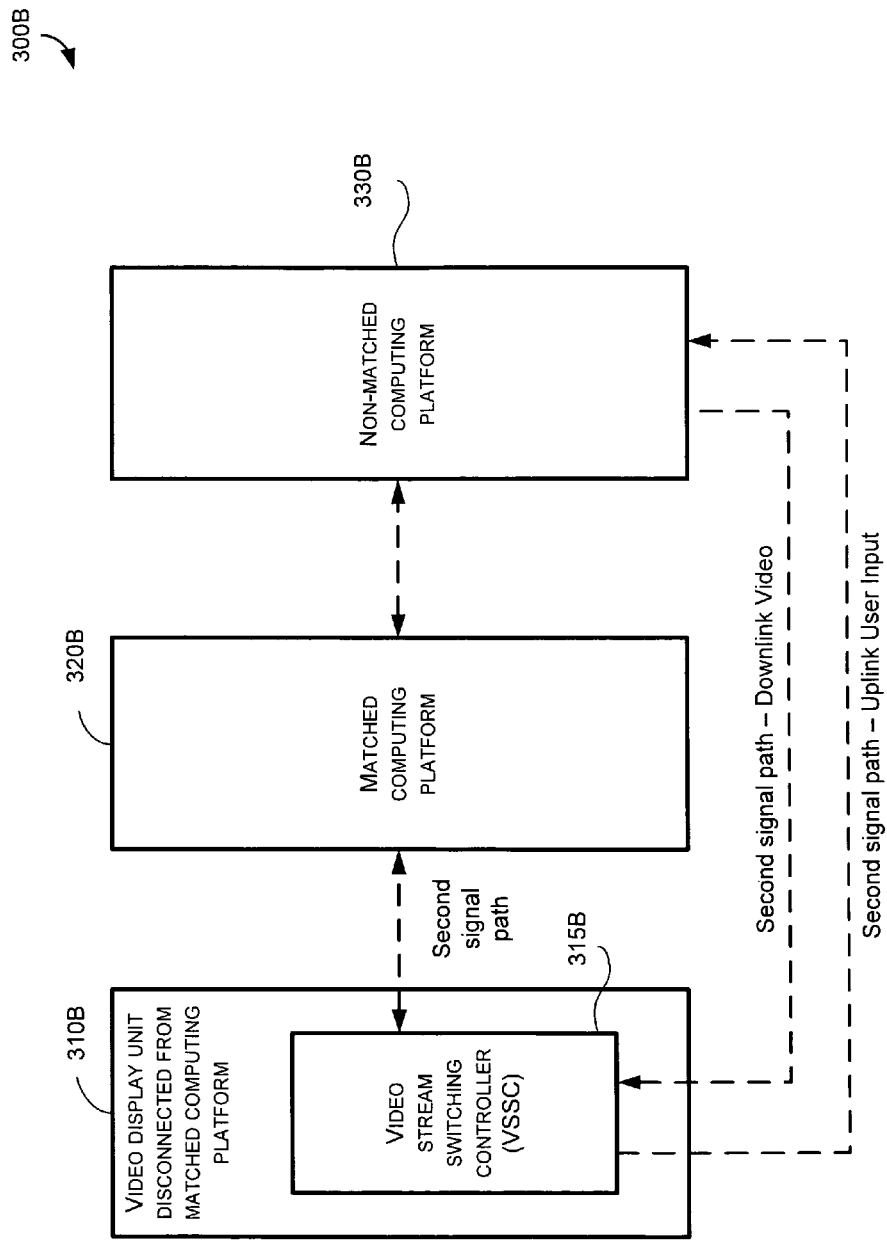
FIG. 3B is a block diagram of a matched computing platform and display in a second mode of operation where the platform and display are physically disconnected, according to some embodiments of the present invention.

Now turning to FIG. 3B, there is shown a block diagram of a matched computing platform and display in a second mode of operation where the platform and display are physically disconnected (300B), according to some embodiments of the present invention.

According to some embodiments of the present invention, a video display unit (310B) disconnected from a matched computing platform (320B) may communicate with the computing platform (320B) via a second (i.e. wireless) signal path. The matched computing platform may transmit one or more video streams directly to a video stream switching controller (VSSC 315B) integral to the video display unit (310B).

According to some embodiments of the present invention, a non-matched computing platform (330B) may communicate with the video display unit (310B) via the second (i.e. wireless) path. The non-matched computing platform (330B) may transmit one or more video streams directly to a video stream switching controller (VSSC 315B) integral to the video display unit (310B). According to further embodiments of the present invention, the video stream may comprise both a video stream downlink and a user input uplink. According to further embodiments of the present invention, the non-matched computing platform (330B) may transmit one or more video streams to the matched computing platform (320B) for transmission of the video streams to the video display unit (310B) over the second signal path.

Figure 3C:
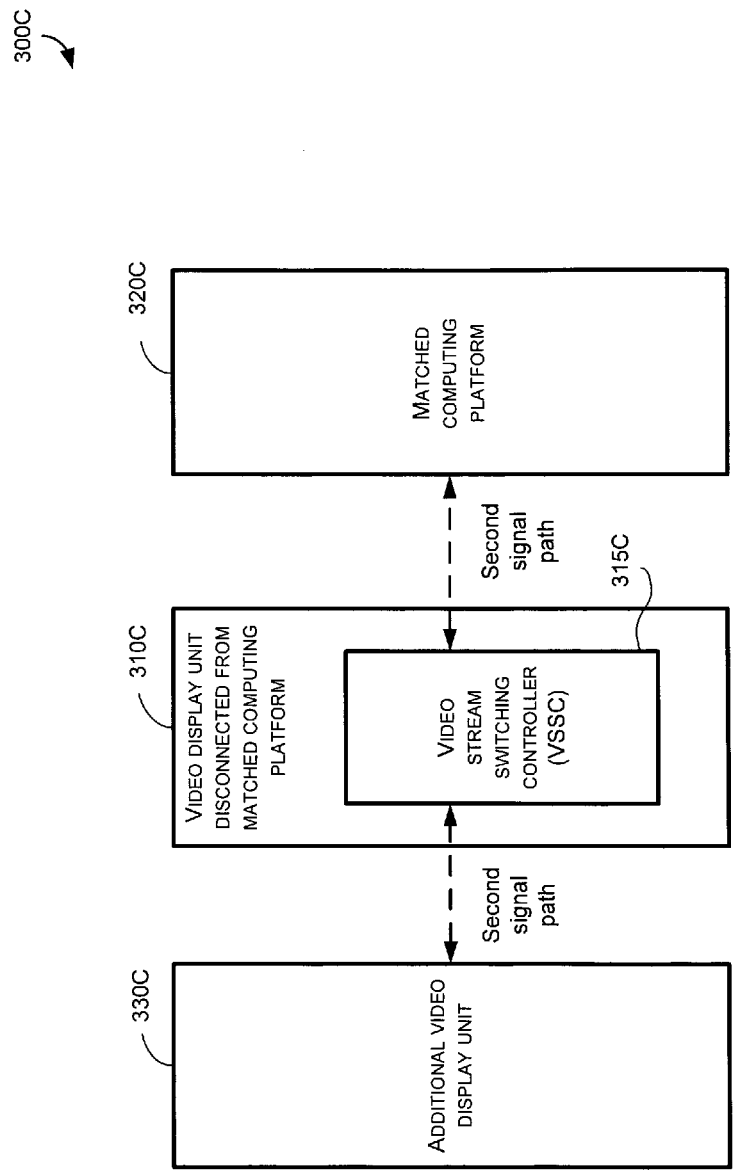
FIG. 3C is a block diagram of a matched computing platform and display in a second mode of operation where the platform and display are physically disconnected, according to some embodiments of the present invention.

Now turning to FIG. 3C, there is shown a block diagram of a matched computing platform and display in a second mode of operation where the platform and display are physically disconnected (300C), according to some embodiments of the present invention.

According to some embodiments of the present invention, a video display unit (310C) disconnected from a matched computing platform (320C) may communicate with the computing platform (320C) via a second (i.e. wireless) signal path. The matched computing platform may transmit one or more video streams directly to a video stream switching controller (VSSC 315C) integral to the video display unit (310C).

According to some embodiments of the present invention, an additional video display unit (330C) may communicate with the video display unit (310C) via the second (i.e. wireless) path. The additional video display unit (330C) may transmit one or more video streams directly to a video stream switching controller (VSSC 315C) integral to the video display unit (310C).

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk—read only memory (CD-ROM), compact disk—read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A system for display of video signals, said system comprising:
   a removable interactive display adapted to display one or more received video signals and receive, via the display, user inputs;
   a matched computing platform adapted to convert video data into video signals and transmit the converted video signals to said interactive display;
   a mount adapted to physically dock said interactive display upon said matched computing platform, thereby matching said matched computing platform to said removable interactive display, said mount facilitating a first video signal path adapted to transfer, over a wired line, video signals from said matched computing platform to said display;
   a second video signal path adapted to transfer wireless video signals from said matched computing platform to said interactive display; and
   control logic within said matched computing platform adapted to: (1) regulate operation of one or more circuits of said display unit, (2) to regulate routing of video signals over said first and second video signal paths to said display, (3) switch streaming of video signals from said first video signal path to said second signal path upon disconnection of said display from said mount, and (4) switch streaming of video signals from said second video signal path to said first signal path upon connection of said display to said mount; and
   a video stream switching controller, within said interactive display, adapted to: (1) switch reception and display of streaming video signals from said first video signal path to said second signal path upon disconnection of said display from said mount, and (2) switch reception and display of streaming video signals from said second video signal path to said first signal path upon connection of said display to said mount.

2. The system according to claim 1, wherein one or more of said converted video signals originate from said matched computing platform.

3. The system according to claim 1, wherein one or more of said converted video signals originate from a non-matched computing platform.

4. The video display unit according to claim 1, wherein one or more of said converted video signals originate from another video display unit.

5. The system according to claim 1, wherein said removable interactive display is further adapted to receive wireless video signals from a non-matched computing platform.

6. The system according to claim 1, wherein said removable interactive display is further adapted to receive wireless video signals from another video display unit.

7. The system according to claim 1, wherein said first video signal path is further adapted to transfer signals to said matched computing platform from said interactive display.

8. The system according to claim 1, wherein said second video signal path is further adapted to transfer wireless signals from said interactive display to said matched computing platform.

9. The system according to claim 8, wherein said second video signal path is further adapted to transfer wireless video signals to a non-matched computing platform.

10. The system according to claim 8, wherein said second video signal path is further adapted to transfer wireless video signals to another video display unit.

11. A computing platform for reception and transmission of video signals, said computing platform comprising:
    processing circuitry adapted to convert video data into video signals and transmit the converted video signals to a removable interactive display;
    a mount adapted to physically dock the interactive display upon said computing platform, said mount facilitating a first video signal path adapted to transfer, over a wired line, video signals from said computing platform to the removable interactive display;
    a second video signal path adapted to transfer wireless video signals from said computing platform to the interactive display; and
    control logic adapted to: (1) regulate operation of one or more circuits of the interactive display, (2) to regulate routing of video signals over said first and second video signal paths from said computing platform, (3) switch streaming of video signals from said first video signal path to said second signal path upon disconnection of the interactive display from said mount, and (4) switch streaming of video signals from said second video signal path to said first signal path upon connection of the interactive display to said mount.

12. The computing platform according to claim 11, wherein one or more of said converted video signals originate from said computing platform.

13. The computing platform according to claim 11, wherein one or more of said converted video signals originate from a non-matched computing platform.

14. The computing platform according to claim 11, wherein one or more of said converted video signals originate from another video display unit.

15. The computing platform according to claim 11, wherein said second video signal path is further adapted to transfer wireless video signals to a non-matched computing platform.

16. The computing platform according to claim 11, wherein said second video signal path is further adapted to transfer wireless video signals to another video display unit.

17. The computing platform according to claim 11, further comprising a first signal reception path adapted to receive signals from the interactive display.

18. The computing platform according to claim 11, further comprising a first signal reception path adapted to receive wireless signals from the interactive display.

19. The computing platform according to claim 18, wherein said first signal reception path is further adapted to receive wireless video signals from a non-matched computing platform.

20. The computing platform according to claim 18, wherein said first signal reception path is further adapted to receive wireless video signals from another video display unit.

\* \* \* \* \*